United States Patent
Malcolm

[11] Patent Number: 5,997,241
[45] Date of Patent: Dec. 7, 1999

[54] AUTOMATIC PALLET LOADING SYSTEM AND A METHOD FOR LOADING PALLETS

[75] Inventor: Keith E. Malcolm, Elk Grove Village, Ill.

[73] Assignee: Midaco Corporation, Elk Grove Village, Ill.

[21] Appl. No.: 08/822,813

[22] Filed: Mar. 24, 1997

[51] Int. Cl.⁶ .................................................. B65G 37/00
[52] U.S. Cl. ........................................ 414/806; 198/346.1
[58] Field of Search ........................ 414/222.04, 222.07, 414/222.1, 222.11, 222.12, 806; 198/346.1, 346.2

[56] References Cited

U.S. PATENT DOCUMENTS

| | | |
|---|---|---|
| 4,144,960 | 3/1979 | Scourtes . |
| 4,705,445 | 11/1987 | Morita et al. ..................... 198/346.1 X |
| 4,799,582 | 1/1989 | Itoh . |
| 4,859,137 | 8/1989 | Bonora et al. ........................ 414/940 X |
| 4,934,031 | 6/1990 | Maeda et al. ..................... 198/346.1 X |
| 4,970,765 | 11/1990 | Sakawa et al. ................... 198/346.1 X |
| 4,995,502 | 2/1991 | Kitamura ............................... 198/346.1 |
| 5,018,617 | 5/1991 | Miyata et al. ......................... 198/346.1 |
| 5,062,190 | 11/1991 | Kitamura . |
| 5,067,703 | 11/1991 | Keith . |
| 5,099,981 | 3/1992 | Guzzoni ................................ 198/346.1 |
| 5,161,662 | 11/1992 | Kuse .................................. 198/346.1 X |
| 5,167,405 | 12/1992 | Cayley, Jr. . |
| 5,249,662 | 10/1993 | Nakano et al. . |
| 5,286,148 | 2/1994 | Cayley, Jr. . |
| 5,346,051 | 9/1994 | Keith . |
| 5,370,212 | 12/1994 | Mizutani et al. . |
| 5,813,514 | 9/1998 | Keith ................................. 198/346.1 X |

FOREIGN PATENT DOCUMENTS

| | | |
|---|---|---|
| 63-16942 | 1/1988 | Japan . |
| 4063658 | 2/1992 | Japan ................................. 198/346.1 |
| 5104415 | 4/1993 | Japan ................................. 198/346.1 |

*Primary Examiner*—James W. Keenan
*Attorney, Agent, or Firm*—Patents & TMS, P.C.; Brian M. Mattson

[57] ABSTRACT

A system and a method are provided for automatically loading and unloading pallets holding a workpiece for machining of the workpiece within a machining area. The pallets are loaded into the machining area by transfer of a pallet from the staging area to a machining area. Rails which maintain the pallets within each area are aligned. An arm having pins at each end engages passageways associated with the pallets and the machining area, respectively. As a result, the pallet may be transferred from the staging area to the machining area and back as the arm translates within the passageways.

7 Claims, 5 Drawing Sheets

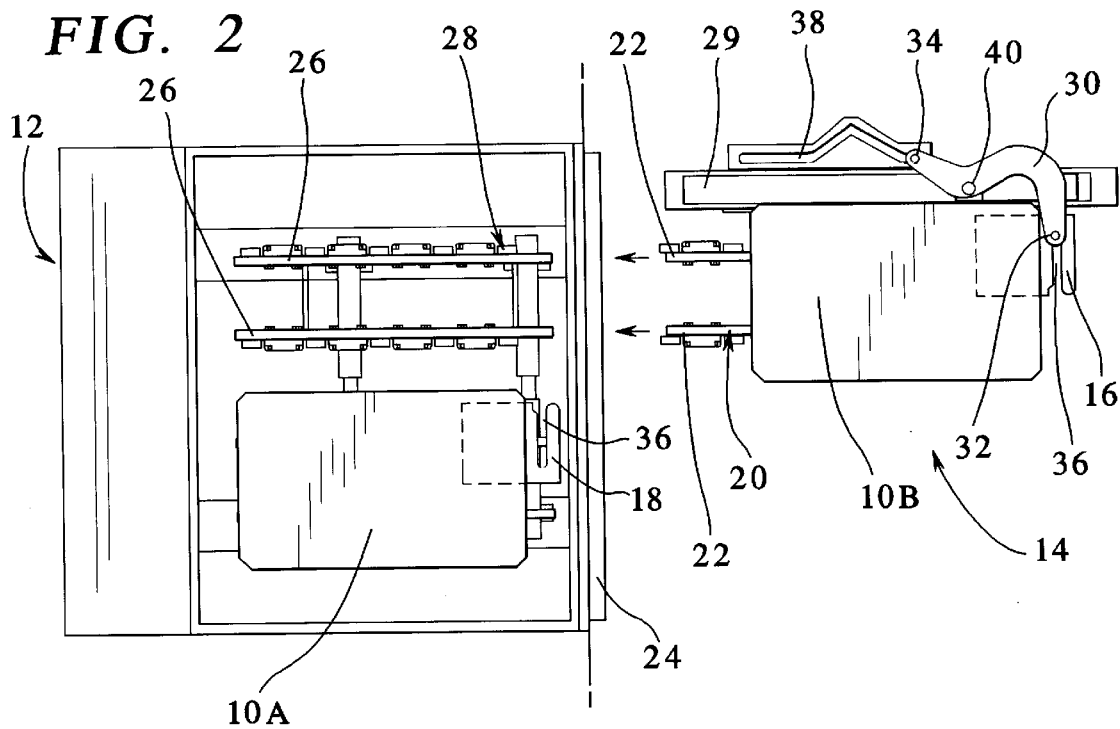
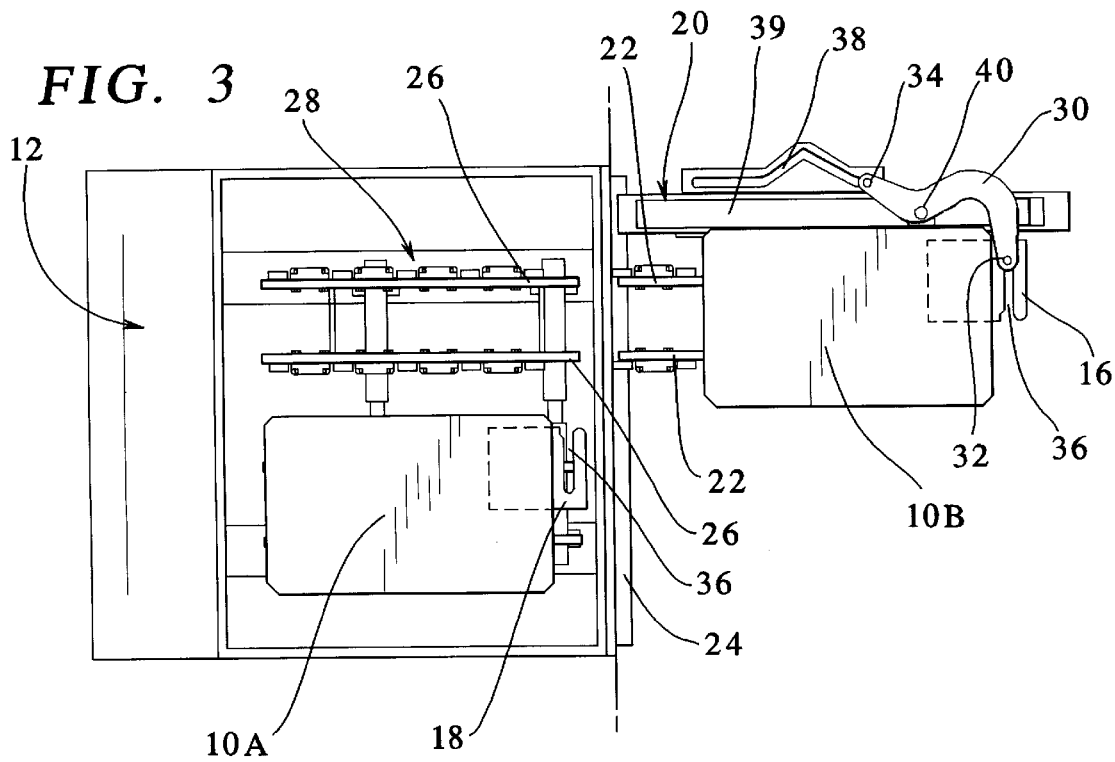

AUTOMATIC PALLET LOADING SYSTEM AND A METHOD FOR LOADING PALLETS

BACKGROUND OF THE INVENTION

The present invention generally relates to an automatic pallet loading system and a method for loading pallets. More specifically, the present invention relates to an automatic pallet loading system and method which allows plurality of pallets to be individually and automatically loaded onto a machine for processing of a workpiece carried by the pallet.

It is, of course, generally known to provide pallet loading systems. For example, one known pallet loading system is described in U.S. Pat. No. 5,346,051 which shows a quick changeover pallet system. Also, U.S. Pat. Nos. 5,286,148 and 5,167,405 show pallet loading systems that are commonly assigned to the assignee of the present invention.

Another known automatic end load pallet loading system is disclosed in co-pending U.S. patent application Ser. No. 08/575,138, now U.S. Pat. No. 5,813,514 commonly assigned to the assignee of the present invention. The pallet loading and changing system disclosed in that application, the disclosure of which is incorporated herein in its entirety by reference, allows two or more pallets to be automatically placed in an automatic machine, such as an automatic vertical machining center, capable of performing a number of operations to produce a finished part from a blank workpiece mounted on the pallet.

Typically, the machining operation on a workpiece, such as milling, may take a substantial period of time, for example, three or more hours. In such an instance, the machining center need not be monitored during the machining operation. However, once the machining is completed, the operation ceases since only a single workpiece is available to be machined. If additional pallets were loaded and/or staged with a workpiece to be machined, subsequent pallets may be loaded into the machine for a milling operation to take place after employees have left the plant.

A need, therefore, exists for an improved automatic pallet loading machine and method that overcomes the deficiencies of known systems.

SUMMARY OF THE INVENTION

The present invention provides a system and a method for automated pallet loading and unloading.

To this end, in an embodiment of the present invention, a system for automatically loading pallets is provided. The system has a staging area and a plurality of pallets horizontally maintained in the staging area. An engaging plate is associated with each of the pallets. A machining area is capable of cooperating with the staging area such that a portion of the machining area aligns with a portion of the staging area to selectively transfer one of the plurality of pallets from the staging area to the machining area and vice versa. Transfer means is associated with the machining area, and an arm is associated with the transfer means wherein the arm is translatable by the transfer means between at least two positions such that the pallet is transferable from the staging area to the machining area and vice versa.

In an embodiment, a passageway is associated with each of the engaging plates. The passageways may be linear or nonlinear.

In an embodiment, a passageway is associated with the transfer means.

In an embodiment, an engaging element is provided at each end of the arm wherein the engaging element at one end selectively engages the engaging plate of the pallet and the engaging element at an opposite end engages the transfer means.

In an embodiment, the arm in non-linear.

In an embodiment, a second passageway is provided wherein an engaging element at a point intermediate ends of the arm translates in the second passageway. The second passageway may be linear.

In an embodiment, rails in the staging area and the machining area are capable of aligning to effect transfer of the pallets.

In another embodiment of the present invention, a method is provided for automatically transferring a pallet. The method comprises the steps of: providing a staging area including a rail on which the pallet is supported; providing a machining area including a rail on which the pallet is supported; aligning the rail of the staging area with the rail of the machining area; providing an arm in the machining area; engaging the pallet in the staging area with one end of the arm; maintaining an opposite end of the arm in a passageway in the machining area; and transferring the pallet from the staging area to the machining area via translation of the opposite end of the arm in the passageway.

In an embodiment, the pallet is returned from the machining area to the staging area.

In an embodiment, shifting the rail of the machining area take place to align with a second rail in the staging area wherein the second rail supports a second pallet.

In an embodiment, an engaging plate associated with the pallet is provided.

In an embodiment, a passageway is provided in the engaging plate wherein the arm has a pin at one end that cooperates with the passageway in the engaging plate.

In an embodiment, a pin is provided at the opposite end of the arm such that the arm translates along the passageway through which the pin extends.

In an embodiment, continuously loading and unloading of subsequent pallets staged in the staging area is provided.

It is, therefore, an advantage of the present invention to provide a system and a method for automatic pallet loading.

Another advantage of the present invention is to provide a system and a method for automatic pallet loading that allows machining of a workpiece during off hours or without monitoring the same.

And, another advantage of the present invention is to provide a system and a method for automatic pallet loading that increases production.

Yet another advantage of the present invention is to provide a system and a method for automatic pallet loading that reduces down time.

Moreover, an advantage of the present invention is to provide a system and method for automatic pallet loading that is smooth in operation with minimal parts.

These and other advantages of the present invention are described in, and will be apparent from, the detailed description of the presently preferred embodiments and from the drawings.

BRIEF DESCRIPTION OF THE DRAWINGS

FIG. 2 illustrates a top plan view of an embodiment of an automatic pallet loading system of the present invention with one pallet unloaded.

FIG. 3 illustrates a top plan view of an embodiment of an automatic pallet loading system of the present invention in a first step of unloading one of the pallets.

DETAILED DESCRIPTION OF THE PRESENTLY PREFERRED EMBODIMENTS

The present invention provides an automatic pallet loading system wherein pallets may be loaded having a workpiece thereon. The pallet is loaded into a machining center for, preferably, a milling operation to be performed on the workpiece loaded on the pallet.

Figure 1:
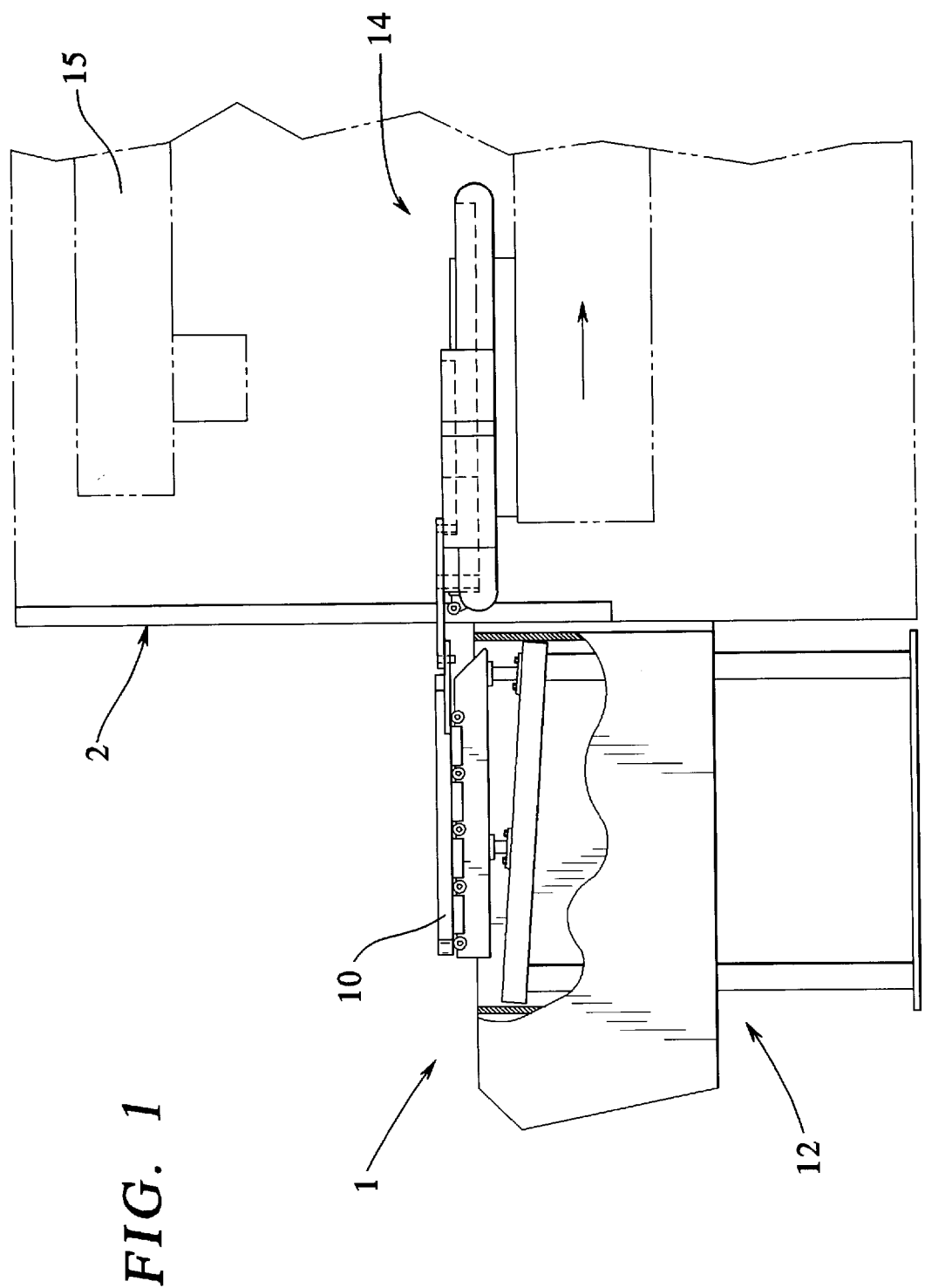
FIG. 1 illustrates a side view of an embodiment of a pallet loading system of the present invention.

Referring now to the drawings wherein like numerals refer to like parts, FIG. 1 generally illustrates a pallet loading system 1 and a machining center 2. The pallet loading system 1 includes a pallet 10 transferable from a staging area generally designated at 12 into a machining area generally designated at 14. Within the machining area 14, the pallet 10 is generally received for effecting a machining operation, such as milling, on a workpiece (not shown) held on the pallet 10. To this end, a machine 15 is provided and is suitably controlled to perform the machining operation on the workpiece. A pallet receiving section 20 may be provided in the machining area 14 and may also be suitably controlled to move within the machining area 14 such that the machine 15 can perform its machining operation on the workpiece held by the pallet 10. Of course, the receiving section 20 and the machine 15 are programmed and controlled to operate within the confines of the machining area 14 of the machining center 2. The simplified transfer of the pallet 10 from the staging area 12 to the machining area 14 in the machining center 2 is the primary focus of the present invention and the operation thereof will be described with reference to FIGS. 2–9. Again, in FIGS. 2–9, like numerals refer to like parts.

Referring to FIG. 2, the staging area 12 is shown having a first pallet 10A staged thereon. A second pallet 10B is provided in the machining area 14 in which a machining operation can be performed on a workpiece (not shown) while the pallet 10B holds the workpiece and maneuvers the workpiece within the machining area 14 of the machining center 2. As illustrated, the pallets 10A,10B are generally maintained in a horizontal orientation throughout the operation. In this way, the workpiece held on the pallets 10A,10B does not move due to any tilt or slant of the pallets 10A,10B.

Each of the pallets 10A,10B includes a pallet engaging element 16, 18 that may be integrally formed with each of the pallets 10A,10B. The function of the pallet engaging elements 16,18 with respect to loading and unloading of the pallets 10A,10B will be readily apparent throughout the description. In the pallet machining area 14, the pallet 10B is loaded onto a pallet receiving section generally designated at 20. The pallet receiving section 20 includes rails 22 attachable to the staging area 12 on an alignment rail 24 associated therewith as generally shown in FIG. 3. The alignment rail 24 allows the rails 22 to position themselves thereon and align with rails 26 of a pallet loading section 28 in the staging area 12. Conventional computer controls may be implemented by those skilled in the art to control and to provide alignment of the rails 22 of the pallet receiving section 20 in the machining area 14 with the rails 26 of the pallet loading section 28 in the staging area 12.

Figure 4:
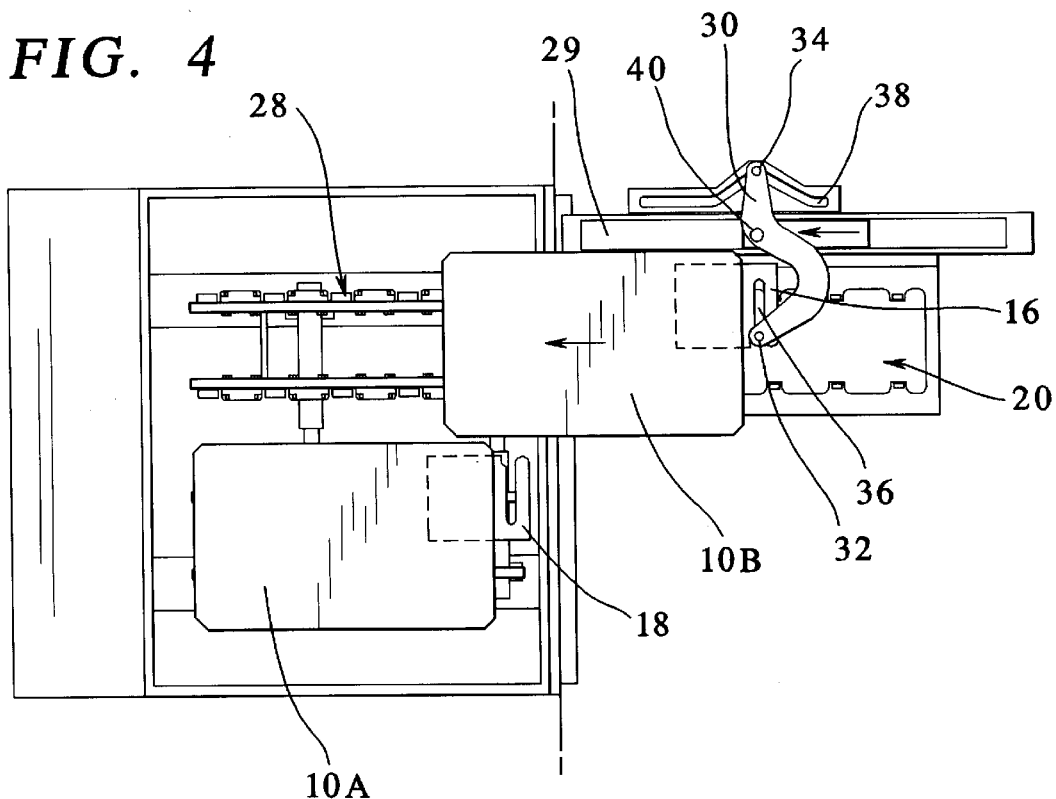
FIG. 4 illustrates a top plan view of an embodiment of an automatic pallet loading system of the present invention in a second step of unloading one of the pallets.
Figure 5:
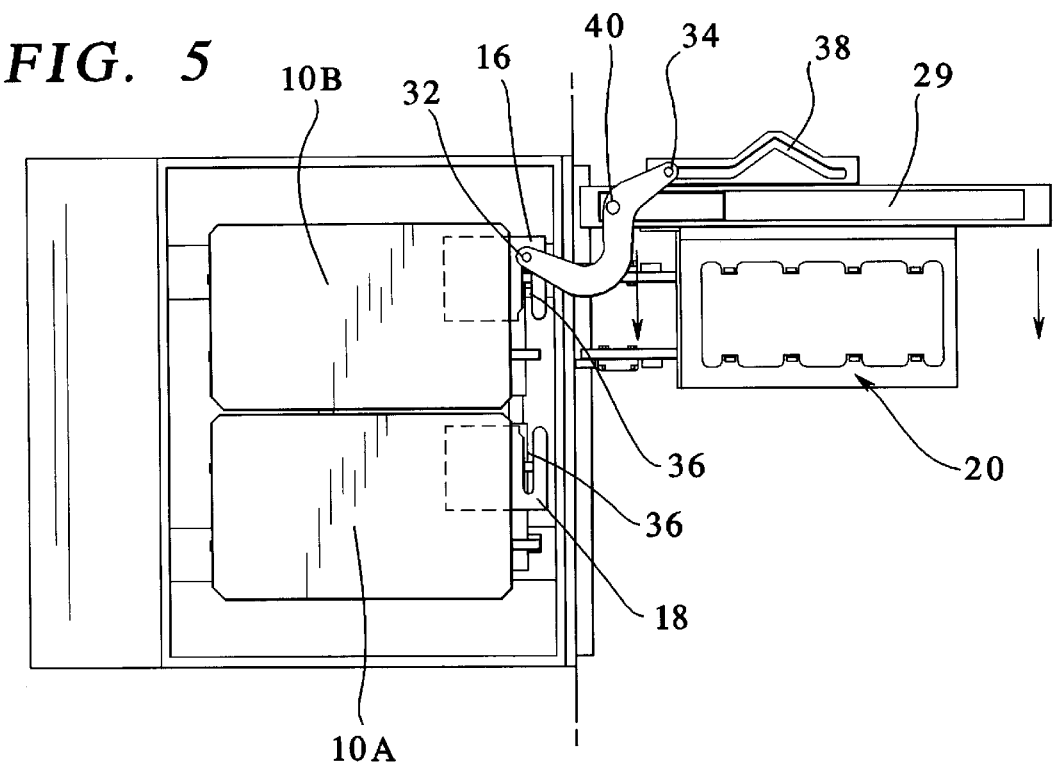
FIG. 5 illustrates a top plan view of an embodiment of an automatic pallet loading system of the present invention with both pallets unloaded.
Figure 6:
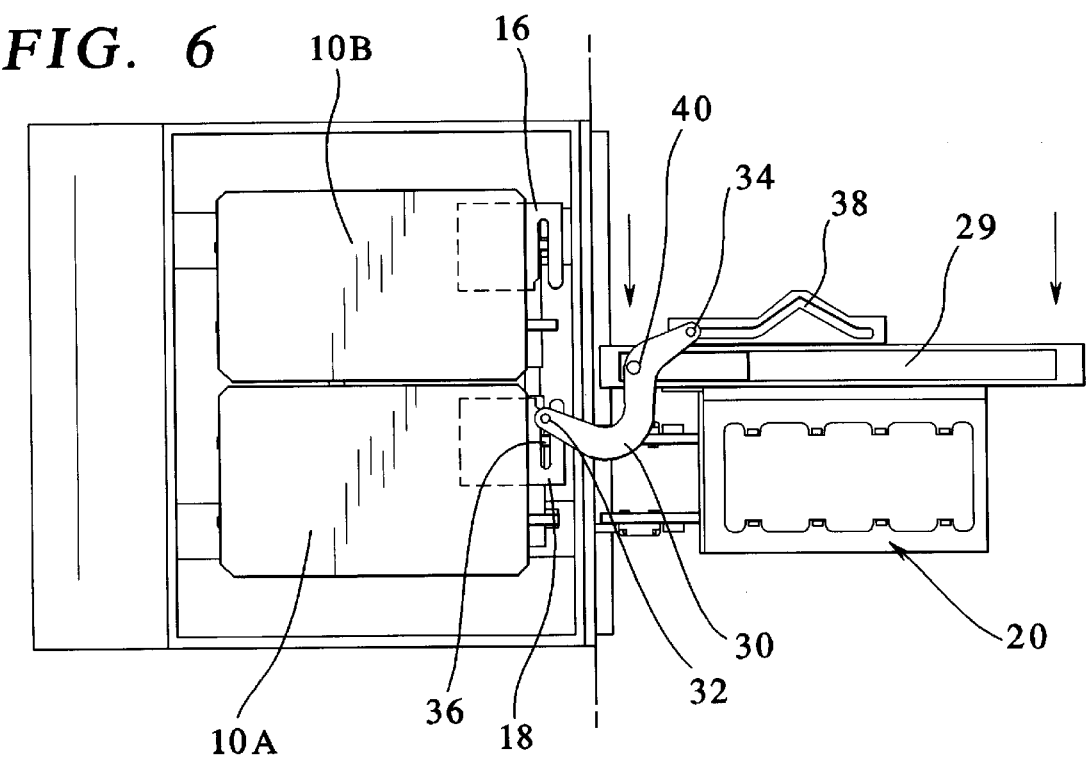
FIG. 6 illustrates a top plan view of an embodiment of an automatic pallet loading system of the present invention in a first step of loading a second one of the pallets.
Figure 7:
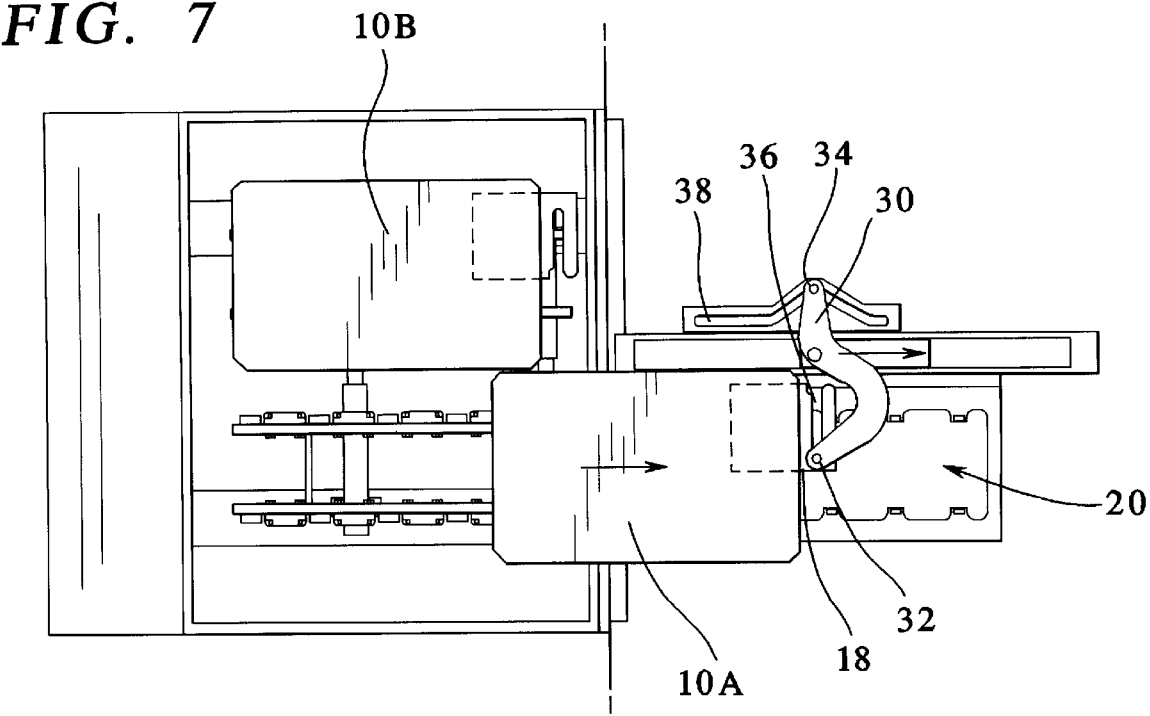
FIG. 7 illustrates a top plan view of an embodiment of an automatic pallet loading system of the present invention in a second step of loading a second one of the pallets.
Figure 8:
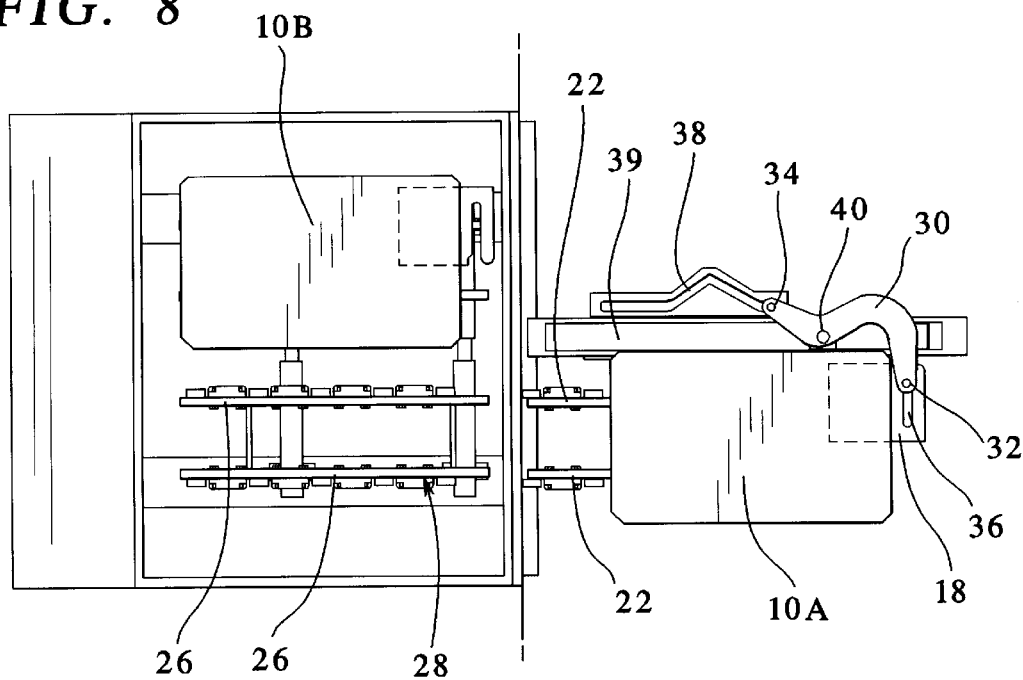
FIG. 8 illustrates a top plan view of an embodiment of an automatic pallet loading system of the present invention in a third step of loading a second one of the pallets.
Figure 9:
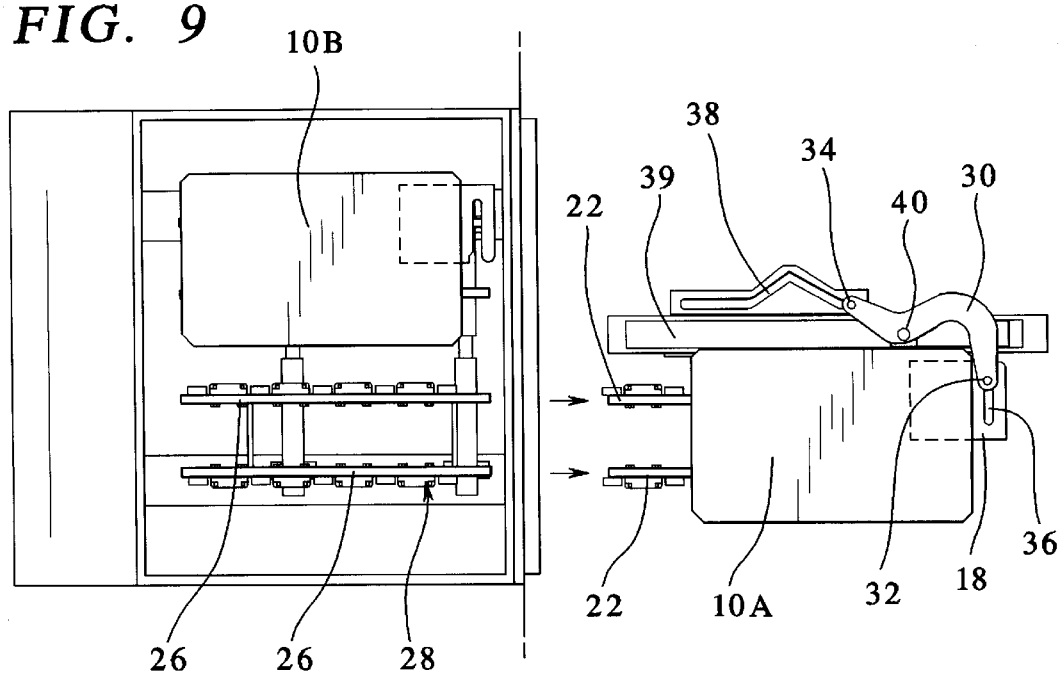
FIG. 9 illustrates a top plan view of an embodiment of an automatic pallet loading system of the present invention with a second one of the pallets loaded.

As shown with reference to FIGS. 3 and 4, after alignment of the rails 22 with the rails 26, the pallet 10B may be unloaded from the pallet receiving section 20 and transferred to the pallet loading section 28. To this end, an arm 30 having a first engaging pin 32 at one end and a second engaging pin 34 at its opposite end provides for transfer of the pallet 10 and guidance of the arm 30 with the engaging pins 32, 34 transferring within designated passageways 36,38, respectively. A motor (not shown) engages and drives the arm 30 via a point 40 such that the pin 40 translates in a passageway 39 and the arm 30 follows the path of the passageway 38. The arm 30 is designed such that as the arm 30 is pushed from right to left with reference to FIGS. 3–5, the pin 34 associated with the arm 30 follows the passageway 38. When the pin 34 reaches the pinnacle point of the passageway 38, the engaging pin 32 at the opposite end of the arm 30 is pushed to an extreme end of its respective passageway 36 as shown with reference to FIG. 4. The arm 30 is then driven to the position illustrated in FIG. 5.

At that point, the arm 30 has completed the transfer of the pallet 10B from the pallet receiving section 20 to the pallet loading section 28 in the staging area 12. The arm 30 can then be laterally shifted along with the pallet receiving section 20 to engage the pallet engaging plate 18 connected to the other pallet 10A in the staging area 12. Engagement of the pallet engaging plate 18 of the pallet 10A is generally shown with reference to FIG. 6.

When the pallet 10A is engaged, the arm 30 is translated in the passageway 38 opposite to that described with reference to FIGS. 2–5 such that the pallet 10A is removed from the pallet loading section 28 of the staging area 12 to the pallet receiving section 20 of the machining area 14. Accordingly, the engaging pin 34 is transferred within the passageway 38 such that the second pallet 10A is transferred from the position illustrated in FIG. 7 to the position illustrated in FIG. 9 for a machining operation to take place on a workpiece (not shown) held on the pallet 10A.

Transfer of the pallets 10A,10B is performed and controlled by a computer programmed to control the transfer operation of the pallets 10A,10B. After a machining operation, such as milling, takes place on the workpiece carried by the second pallet 10A, the pallet 10A may then be returned to the staging area 12 and the opposite pallet 10B may be retrieved from the staging area 12 and a workpiece held thereon may be machined in the machining area 14.

Although the preferred embodiment illustrated and described shows two pallet loading sections 28 in the staging area 12 of the pallet loading system 1, it should be understood that more than two loading sections may be implemented by those skilled in the art. This can be particularly useful in machining or milling operations that take place in intervals of less than two hours. In this instance, several loading sections may be necessary or desired to maximize efficiency and minimize downtime of the machining center 2.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for automatically transferring pallet, the method comprising the steps of:

providing a staging area including a rail on which the pallet is supported;

providing a machining area including a rail on which the pallet is supported;

aligning the rail of the staging area with the rail of the machining area;

providing an arm in the machining area wherein the arm has a first end and a second end and further wherein the arm has an axis point intermediate the first end and the second end around which the first end and second end are rotatable;

engaging the pallet in the staging area with the first end of the arm;

maintaining the second end of the arm in a passageway in the machining area; and transferring the pallet from the staging area to the machining area via rotation of the arm at the axis point and further via translation of the second end of the arm in the passageway.

2. The method of claim 1 further comprising the step of:

returning the pallet from the machining area to the staging area.

3. The method of claim 1 further comprising the step of:

shifting the rail of the machining area to align with a second rail in the staging area wherein the second rail supports a second pallet.

4. The method of claim 1 further comprising the step of:

providing an engaging plate associated with the pallet.

5. The method of claim 4 further comprising the step of:

providing a slot in the engaging plate wherein the arm has a pin at the first end that cooperates with the slot in the engaging plate.

6. The method of claim 1 further comprising the step of:

providing a pin at the second end of the arm such that the arm translates along the passageway through which the pin extends.

7. The method of claim 1 further comprising the step of:

continuously loading and unloading subsequent pallets staged in the staging area.

* * * * *